United States Patent
Recio et al.

(10) Patent No.: US 10,128,768 B2
(45) Date of Patent: Nov. 13, 2018

(54) METER/VOLTAGE REGULATOR WITH VOLT-AMPERE REACTIVE CONTROL POSITIONED AT CUSTOMER SITE

(71) Applicant: The Powerwise Group, Inc., Boca Raton, FL (US)

(72) Inventors: Christopher John Recio, Boca Raton, FL (US); Christopher Lynn Caswell, Delray Beach, FL (US); Michael Gerard Tobin, Boca Raton, FL (US); Zoran Miletic, Burnaby (CA); Sergio Pieiga, III, Coral Springs, FL (US)

(73) Assignee: The Powerwise Group, Inc., Boca Raton, FL (US)

( * ) Notice: Subject to any disclaimer, the term of this patent is extended or adjusted under 35 U.S.C. 154(b) by 602 days.

(21) Appl. No.: 14/623,796

(22) Filed: Feb. 17, 2015

(65) Prior Publication Data

US 2015/0236510 A1    Aug. 20, 2015

Related U.S. Application Data

(60) Provisional application No. 61/940,205, filed on Feb. 14, 2014.

(51) Int. Cl.
*H02J 3/00* (2006.01)
*H02M 5/02* (2006.01)
*H02J 3/18* (2006.01)
*H02J 3/32* (2006.01)

(52) U.S. Cl.
CPC ............. *H02M 5/02* (2013.01); *H02J 3/1842* (2013.01); *H02J 3/1892* (2013.01); *H02J 3/32* (2013.01); *Y02E 40/22* (2013.01); *Y10T 307/658* (2015.04)

(58) Field of Classification Search
CPC .......... H02J 3/1842; H02J 3/1892; H02J 3/32; H02M 5/02
USPC ........................................................... 307/72
See application file for complete search history.

(56) References Cited

U.S. PATENT DOCUMENTS

| | | | |
|---|---|---|---|
| 6,949,843 B2 * | 9/2005 | Dubovsky | H02J 3/382 307/64 |
| 7,929,327 B2 * | 4/2011 | Haines | H02J 9/062 363/106 |
| 8,803,363 B2 * | 8/2014 | Veltri | H02J 3/30 307/47 |

(Continued)

*Primary Examiner* — Ryan Jager
(74) *Attorney, Agent, or Firm* — Ingram IP Law, P.A.

(57) ABSTRACT

A method and system are provided for sourcing and sinking reactive power to an electric grid. The control system includes a terminal electrically coupled to a power source that originates from an electric utility grid. The terminal receives a grid alternating current having a real power component and a reactive power component. A power converter is electrically coupled to the terminal, the power converter includes an active rectifier that converts substantially all of the grid alternating current to a direct current and an energy storage device that stores energy supplied by the direct current. The active rectifier sources the reactive power component and the stored energy through the terminal to the electric utility grid. The power converter further includes an inverter that converts the direct current to a load alternating current having at least one of a load real power component and a load reactive power component.

14 Claims, 15 Drawing Sheets

(56) References Cited

U.S. PATENT DOCUMENTS

| | | | |
|---|---|---|---|
| 2014/0103727 A1* | 4/2014 | Taimela | H02J 3/24 307/76 |
| 2015/0061644 A1* | 3/2015 | Parks | H01R 33/94 324/126 |
| 2016/0211743 A1* | 7/2016 | Harrison | H02J 3/1835 |

* cited by examiner

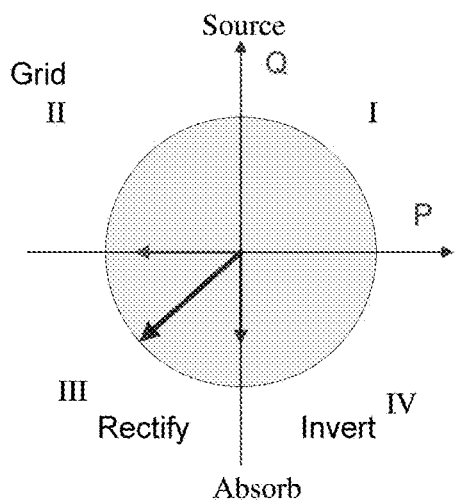 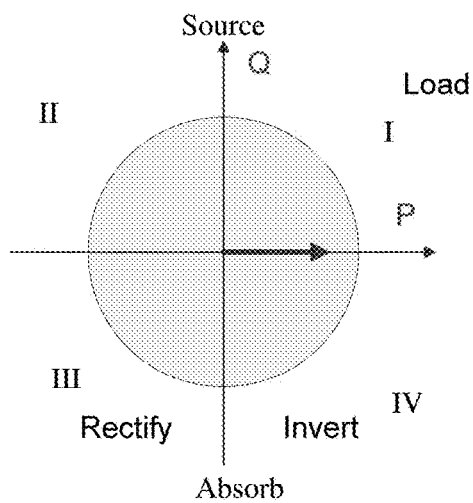
FIG. 10A         FIG. 10B
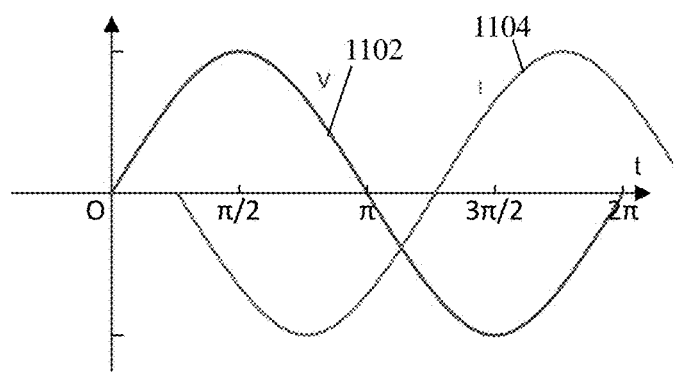
FIG. 11

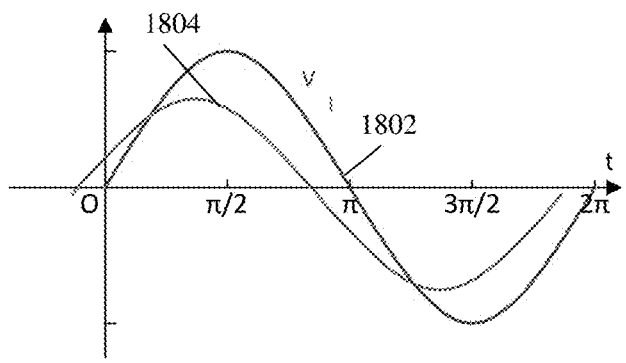
FIG. 18
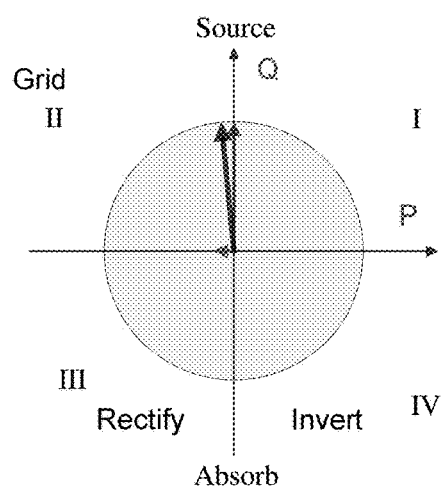          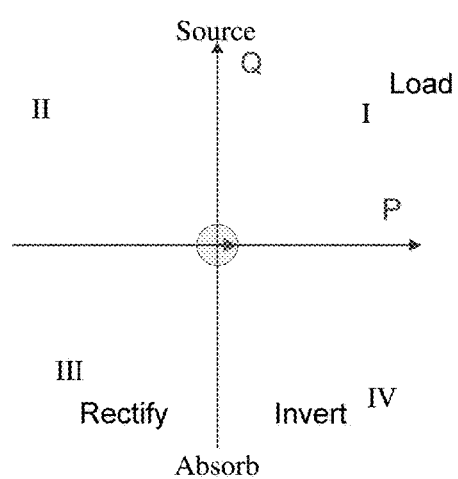
FIG. 19A                      FIG. 19B

METER/VOLTAGE REGULATOR WITH VOLT-AMPERE REACTIVE CONTROL POSITIONED AT CUSTOMER SITE

CROSS-REFERENCE TO RELATED APPLICATIONS

This application claims priority to U.S. Provisional Application 61/940,205, filed Feb. 14, 2014, the complete disclosure of which is incorporated herein by reference in its entirety.

FIELD

The present disclosure relates generally to electric power and more particularly to sourcing and sinking reactive power to an electric utility grid. Still more particularly, the present disclosure relates to sourcing and sinking reactive power relative to the electric grid from customer sites.

BACKGROUND

Electric utilities transmit and distribute electric power for use by end users or customers. The electric power includes real power and reactive power. Real power supplies energy that is needed by a load to perform actual work, such as running a motor. Reactive power provides voltage regulation to the distribution system. Reactive power exists in an alternating current ("AC") electric power system when the current and voltage are not in phase. Reactive power is expressed in volt-ampere reactive ("VAR") units.

During electric power distribution, transmission lines and other devices introduce impedance into the distribution system such as capacitance and inductance. These reactive impedance components cause a current to change phase with respect to the corresponding voltage. For example, capacitance causes a current to lead a voltage in phase, while inductance causes a current to lag a voltage in phase.

Reactive power is introduced into the distribution system to maintain desired voltage levels. For example, reactive power may be introduced into the distribution system having low lagging power factor to reduce "voltage sag". If reactive power in the distribution system is high, then current flowing through the transmission lines and loads of the distribution system is increased, which leads to increased heat loss and lower system efficiency.

BRIEF DESCRIPTION OF THE DRAWINGS

Implementations of the present technology will now be described, by way of example only, with reference to the attached figures, wherein:

FIG. 10A illustrates a power factor when viewed from the electric utility grid side of the control device according to another example of the disclosure;

FIG. 10B illustrates the power factor when viewed from the load side of the control device according to another example of the disclosure;

FIG. 11 illustrates a waveform diagram that corresponds to FIG. 10A;

FIG. 18 illustrates a waveform diagram that corresponds to FIG. 16B;

FIG. 19A illustrates a power factor when viewed from the electric utility grid side of the control device according to another example of the disclosure;

FIG. 19B illustrates the power factor when viewed from the load side of the control device according to another example of the disclosure;

DETAILED DESCRIPTION

Figure 1:
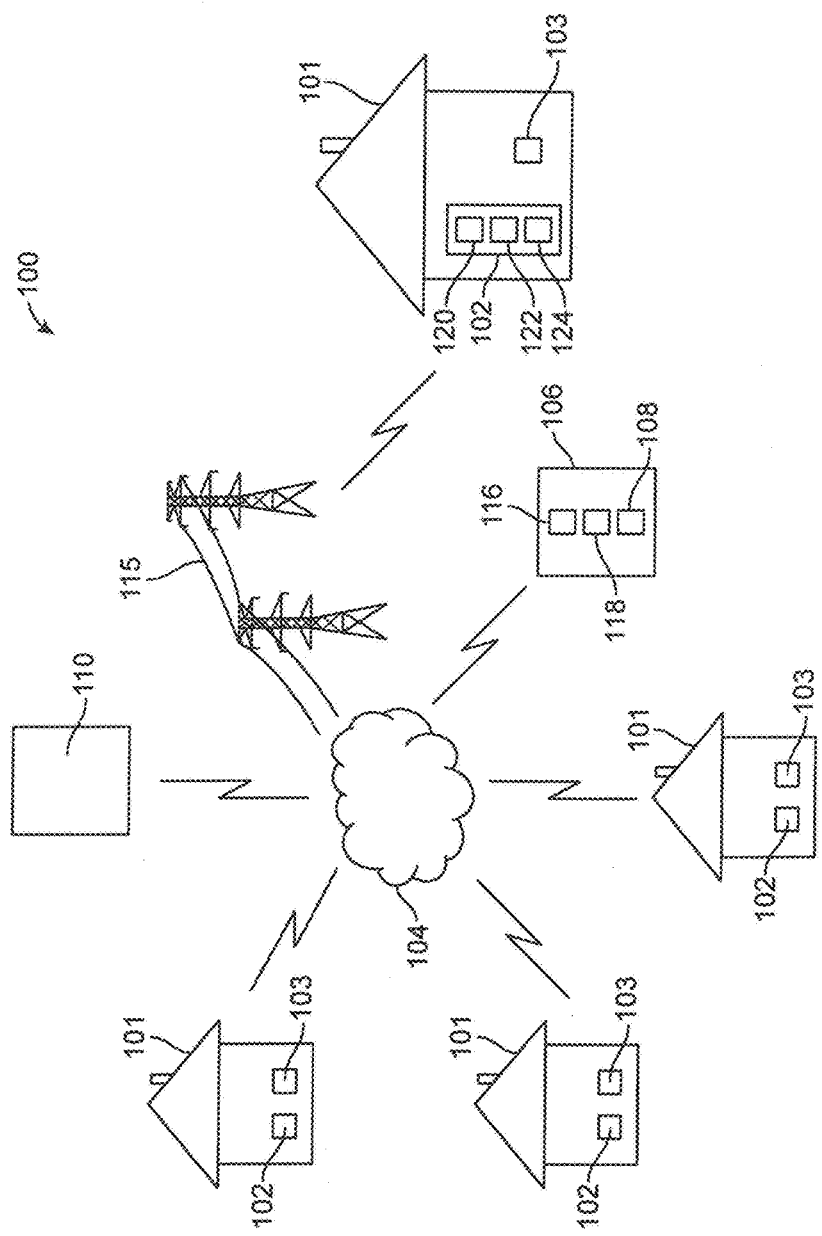
FIG. 1 illustrates an electric utility grid environment according to one example of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. Those skilled in the art with access to the teachings provided herein will recognize additional modifications, applications, and embodiments within the scope thereof and additional fields in which the invention would be of significant utility.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items.

The terms "connected" and "coupled" are not restricted to physical or mechanical connections or couplings, and can include electrical connections or couplings, whether direct or indirect. The connection can be such that the objects are permanently connected or releasably connected. The term "communicatively coupled" is defined as connected, either directly or indirectly through intervening components, and the connections are not necessarily limited to physical connections, but are connections that accommodate the transfer of data, fluids, or other matter between the so-described components. The term "substantially" is defined to be essentially conforming to the thing that it "substantially" modifies, such that the thing need not be exact. For example, substantially real-time means that the occurrence may happen without noticeable delay, but may include a slight delay.

The terms "circuit," "circuitry," and "controller" may include either a single component or a plurality of components, which are either active and/or passive components and may be optionally connected or otherwise coupled together to provide the described function. The "processor" described in any of the various embodiments includes an electronic circuit that can make determinations based upon inputs and is interchangeable with the term "controller." The processor can include a microprocessor, a microcontroller, and a central processing unit, among others, of a general purpose computer, special purpose computer, ASIC, or other programmable data processing apparatus. While a single processor can be used, the present disclosure can be implemented over a plurality of processors.

The "server" described in any of the various embodiments includes hardware and/or software that provides processing, database, and communication facilities. By way of example, and not limitation, "server" may refer to a single, physical processor with associated communications and data storage and database facilities, or it can refer to a networked or clustered complex of processors and associated network and storage devices, as well as operating software and one or more database systems and applications software that support the services provided by the server.

The phrase "electric utility company" is defined as an entity that provides or manages the supply of electrical power or energy to one or more energy customers. The phrase as used in this disclosure encompasses, without limitation, regional utility companies, regional transmission organizations, and any other load servicing entities or entities that manage the power grid within a geographical area. Electric utility companies employ constant frequency generators to produce power at a constant fixed frequency such 60 Hz, 50 Hz, 400 Hz or the like. Energy customers may be any entity that uses electrical power for any purpose. For example, energy customer may include, without limitation, individual home owners, commercial office building tenants, manufacturing operations personnel, or the like. While specific examples described herein are directed to electric utility environments having alternating current such as power grids, one of ordinary skill in the art will readily appreciate that the technology described herein is applicable to any electrical distribution systems having alternating current such as for used in association with aircrafts, ships, submarines, or the like. Furthermore, one of ordinary skill in the art will readily appreciate that the technology described herein applies to electrical distribution systems having alternating current and operating at any fixed frequency such as 60 Hz, 50 Hz, 400 Hz, or the like.

A system and method are needed for adding or removing reactive power relative to the electric grid of a distribution system. Furthermore, a system and method are needed for adding or removing reactive power at customer sites relative to the electric grid in order to obtain desired reactive power values within the distribution system. According to one example, adding or removing reactive power at the end distribution system such as at customer sites is optimal as compared to adding or removing reactive power at other portions of the distribution system such as between the generation facility and the customer sites.

For the purposes of this disclosure a computer readable medium stores computer data in machine readable form. By way of example, and not limitation, the computer readable medium may include computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium that may be used to store the desired information and which can be accessed by the computer.

The terms "comprising," "including" and "having" are used interchangeably in this disclosure. The terms "comprising," "including" and "having" mean to include, but not necessarily be limited to the things so described.

The below description references block diagrams and operational illustrations of methods and devices that control sourcing and absorbing of reactive power into and from the electric grid. It is understood that each block of the block diagrams or operational illustrations, and combinations of blocks in the block diagrams or operational illustrations, can be implemented with analog or digital hardware and computer program instructions. The computer program instructions may be provided to a processor that executes the computer program instructions to implement the functions/ acts specified in the block diagrams or operational block or blocks. In some alternative implementations, the functions/ acts noted in the blocks may occur out of the order noted in the operational illustrations. For example, two blocks shown in succession may in fact be executed substantially concurrently or the blocks may sometimes be executed in the reverse order, depending upon the functionality/acts involved.

Electric utility companies adjust reactive power within the distribution system to control voltage levels and modify power factor of the electric utility grid. Currently, the reactive power is adjusted on the electric utility grid at locations prior to the customer site such as from the generation facility to points prior to the customer sites. This disclosure describes systems and methods of controlling reactive power at customer sites to adjust reactive power values within the distribution system. According to one example, power converters are provided at customer sites having active rectifiers configured as inverters to source and absorb reactive power within the distribution system. According to one example, an amount of reactive power that may be sourced to the electric utility grid is determined based on an amount of power available during power consumption at the customer site. For example, if a control unit is rated at 30 amps at 120 volts, then the control unit can provide up to 3,600 kVA of real power or reactive power. This real power or reactive power can be delivered to the customer site or to the utility as real power, reactive power, or a combination of both. With respect to sourcing reactive power back to the electric utility grid, if the customer site is consuming 2,000 kVA, then the control unit may source up to the remaining 1,600 kVA back to the electric grid.

FIG. 1 illustrates one example of an electric utility grid environment 100. A customer facility 101 such as a residential building, a commercial building, or the like, is provided with energy consuming devices or loads. For example, the energy consuming devices may include computers, refrigerators, televisions, climate control systems such as heating and air conditioning systems, motors, pumps, commercial or manufacturing devices, or the like. According to one example, a plurality of control devices 102 may be provided at the customer sites 101 to control sourcing and absorption of reactive power with respect to the electric grid. The plurality of control devices 102 may be communicatively coupled to a remote server or a computing device within the corresponding customer facility 101.

The control device 102 may be communicatively coupled to a power meter 103 provided at the customer facility 101. Power is transmitted to the customer facility 101 over transmission lines 115 that form part of a power grid. According to one example, the control device 102 may be communicatively coupled to the electric utility grid via a network 104 such as the Internet, a cellular communications network, a private wide area network ("WAN"), a power line communications ("PLC") network, or any other suitable communications technology. The network 104 may be connected to the Internet via conventional routers and/or firewalls. The network 104 also may be connected to a common carrier wireless network such as a CDMA network. The network 104 also may be connected to a wide area network that is connected to the PLC network.

The control device 102 may include an onboard computer having a processor 120 and may be communicatively coupled to a computer readable media 122. The control devices 102 may include a display device 124 having a graphical user interface that enables customers to control the control device 102. Alternatively, the control devices 102 may be remotely controlled by a customer computer via the network 104. Still further, the control devices 102 may be remotely controlled by the electric utility company or other third party via the network 104. Software applications are provided at the control device 102 for interfacing with the power meter 103, the energy consuming devices, and an application server 106 described below, among other components. The software applications may include instructions that are executed by the processor 120.

The power meter 103 is provided at the customer sites 101 to measure power consumed by the energy consuming devices therein. According to one example, the power meter 103 may be furnished by the electric utility company servicing the corresponding customer facility 101. Alternatively, the power meter 103 may be furnished by an entity that is different from the electric utility company. In this case, the power meter 103 may replace any power meter furnished by the electric utility company. Alternatively, the power meter 103 may be communicatively coupled to a power meter furnished by the electric utility company, such as being communicatively coupled in serial fashion. Power may enter the customer facility 101 via the power meter 103 and the control device 102.

According to one example, the power meter 103 may be programmed to measure power consumption in substantially real-time. Accordingly, the power meter 103 may measure the power consumed at the customer facility 101 in substantially real-time and may communicate power consumption data to the control device 102 at preselected intervals. The computer readable media 122 may store data such as the power consumption data or may provide backup or archive for the data received at the control device 102. The preselected intervals may include time intervals such as real-time or continuous, seconds-based, minute-based, hours-based, day-based, month-based, or the like. One of ordinary skill in the art will readily appreciate that other preselected intervals may include intervals triggered by a percentage change in energy consumption, an aggregated amount of energy consumed, a time of day, a day of a month, or the like. One of ordinary skill in the art also will readily appreciate that the control devices 102 and the power meters 103 may be provided in a combined unit or may be provided as separate units.

Referring to FIG. 1, an application server 106 may be provided that communicates with the plurality of control devices 102. The application server 106 may communicate with the plurality of control devices 102 via a network 104 such as the Internet, a cellular communications network, a private WAN, a PLC network, or any other suitable communications technology. According to one example, the network 104 may be associated with a preselected area. For example, the network 104 may be associated with a geographic area such as a street, a neighborhood, a zip code, a county, a state, a region, or the like. The plurality of control devices 102 may be assigned an Internet Protocol (IP) address to track corresponding location information. One of ordinary skill in the art will readily appreciate that other technology may be used to obtain location information.

The application server 106 may include an onboard computer having a processor 116 that is communicatively coupled to a computer readable media 118 that stores data such as in a database. The application server 106 may include a display device having a graphical user interface that enables the electric utility company to control the application server 106. Alternatively, the application server 106 may be remotely controlled by the electric utility company or other third party via the network 104. Software applications are provided at the application server 106 for interfacing with the control device 102, the power meter 103, and the energy consuming devices, among other components. The software applications may include instructions that are executed by the processor 116.

According to one example, the control device 102 may communicate with the power meter 103 and the application server 106 via the network 104. The network 104 may support a transmission control protocol/Internet protocol (TCP/IP) connection, for example, and may be accessed over a cellular communications channel, Wi-Fi, a wired connection, or the like. Once the connection is established, an application may communicate and instruct the control devices 102 to source and/or absorb reactive power with respect to the electric grid in real-time. Data corresponding to the reactive power sourcing and/or absorbing may be received from all other control devices 102 may be aggregated to develop an instantaneous aggregate reactive power sourcing and/or absorbing profile.

According to one example, the control device 102 may communicate with a corresponding application server 106 to provide reactive power sourcing and/or absorbing data for corresponding customer sites 101. The computer readable media 118 may store data such as an amount of the reactive power sourced and/or absorbed or may provide backup or archiving for the data received at the application server 106. At preselected intervals, the plurality of control devices 102 may communicate data corresponding to the reactive power sourced and/or absorbed to the corresponding application server 106. For example, the preselected intervals may include time intervals such as real-time or continuous, seconds-based, minute-based, hours-based, day-based, month-based, or the like. One of ordinary skill in the art will readily appreciate that other preselected intervals may include intervals triggered by a percentage change in reactive power sourced and/or absorbed, an aggregated amount of reactive power sourced and/or absorbed, a time of day, a day of a month, or the like.

According to one example, a software application 108 (hereinafter "application 108") may interface with the application server 106 to access data corresponding to the reactive power sourced and/or absorbed from the corresponding customer sites 101. For example, the application 108 may include instructions that are executed on a processor to aggregate for analysis the data corresponding to the reactive power sourced and/or absorbed. According to one example, the application 108 may analyze the aggregated reactive power sourcing and/or absorbing data obtained from the plurality of control devices 102 to determine aggregated amounts of reactive power sourced and/or absorbed. The aggregated amounts of reactive power sourced and/or absorbed may be determined over any time period such as instantaneously, over an hourly period, a daily period, a weekly period, a monthly period, or the like. Furthermore, the application 108 may analyze additional data during the corresponding time period. The additional data may include environmental data, weather data, or the like. According to one example, the application 108 may analyze the aggregated amounts of reactive power sourced and/or absorbed and/or the additional data to predict future reactive power sourcing and/or absorbing over a pre-selected time period.

According to one example, the application 108 may reside in the computer readable media 118 of the application server 106. Alternatively, the application 108 may reside at a remote client device 110 that is communicatively coupled to the application server 106. The remote client device 110 may communicate with the application server 106 via a network 112. The network 112 may support a TCP/IP connection, for example, via the Internet, a cellular communications network, a private WAN, a PLC network, or any other suitable communications technology. The network 112 may be connected to the Internet via conventional routers and/or firewalls. The network 112 also may be connected to a common carrier wireless network such as a CDMA network. The network 112 also may be connected to a wide area network that is connected to the PLC network.

Figure 2:
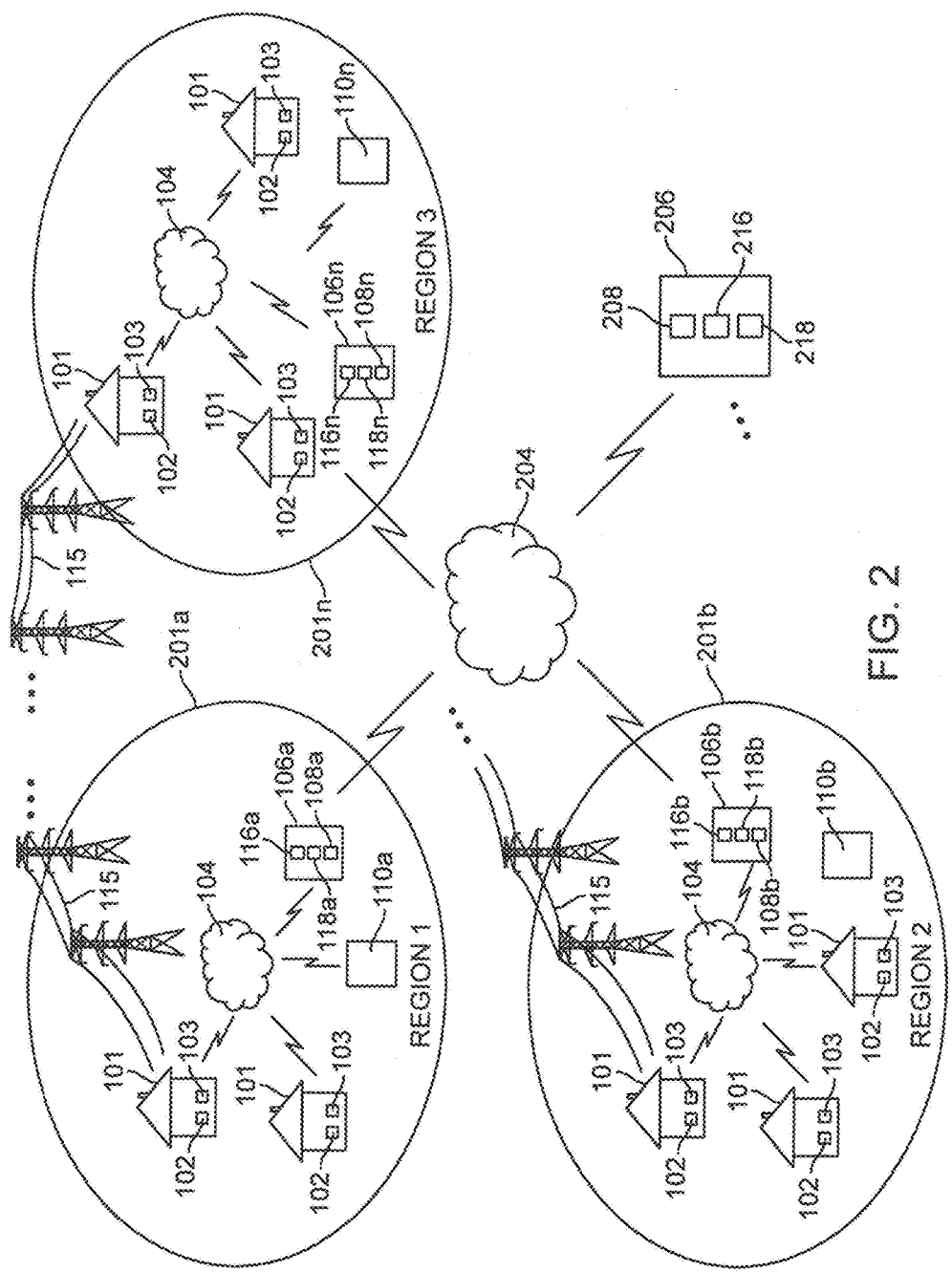
FIG. 2 illustrates an electric utility grid environment according to another example of the disclosure.

With reference to FIG. 2, a plurality of regions 201a-201n may be defined, with each region 201a-201n including components illustrated in FIG. 1. The plurality of regions 201a-201n may be defined according to geographic area such as a street, a neighborhood, a zip code, a county, a state, a region, or the like. Alternatively, the plurality of regions 201a-201n may be defined according to a customer type such as residential customers, commercial customers, industrial customers, hospitals, police stations, emergency response units, or the like. One of ordinary skill in the art will readily appreciate that the plurality of regions 201a-201n may have any desired characteristics.

According to one example, the plurality of regions 201a-201n may define customers within selected geographical counties. A plurality of customer sites 101 provided with the control device 102 and the power meter 103 as described above may be associated with the corresponding plurality of regions 201a-201n. Furthermore, the application servers 106a-106n may be associated with the corresponding plurality of regions 201a-201n and may communicate with the plurality of control devices 102 as described above. Alternatively, one of ordinary skill in the art will readily appreciate that an application server 206 may be associated with two or more of the plurality of regions 201a-201n.

The application server 206 may include an onboard computer having a processor 216 that is communicatively coupled to a computer readable media 218 that stores data such as in a database. The application server 206 may include a display device having a graphical user interface that enables the electric utility company to control the application server 206. Alternatively, the application server 206 may be remotely controlled by the electric utility company via the network 204. Software applications are provided at the application server 206 for interfacing with the control device 102, power meter 103, the application servers 106a-106n, and the energy consuming devices. The software applications may include instructions that are executed by the processor 216.

A network 204 may be provided to communicatively couple the plurality of regions 201a-201n and the application server 206. The network 204 may support a TCP/IP connection, for example, via the Internet, a cellular communications network, a private WAN, a PLC network, or any other suitable communications technology. The network 204 may be connected to the Internet via conventional routers and/or firewalls. The network 204 also may be connected to a common carrier wireless network such as a CDMA network. The network 204 also may be connected to a wide area network that is connected to the PLC network. A software application 208 (hereinafter "application 208") may interface with the application server 206 to access the reactive power sourcing and/or absorbing data obtained from the plurality of regions 201a-201n.

Figure 3:
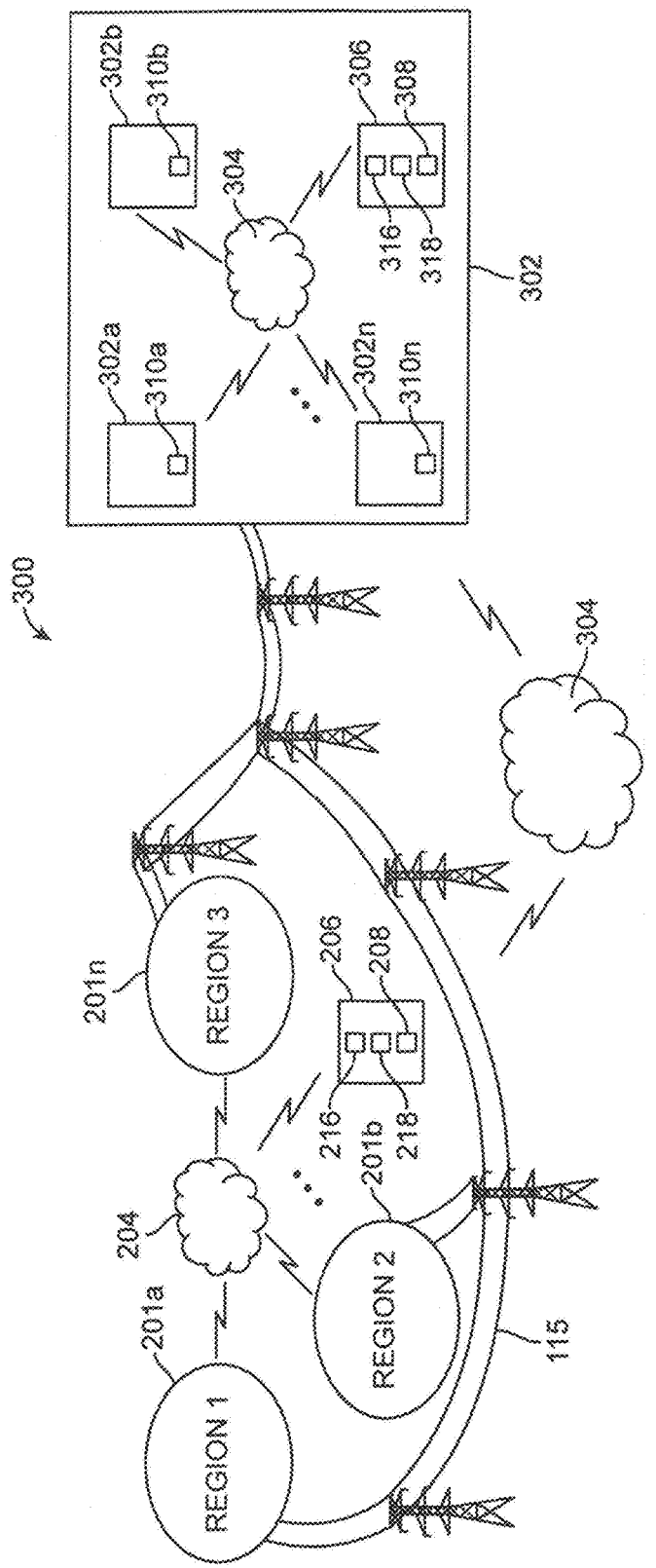
FIG. 3 illustrates an electric utility grid environment according to yet another example of the disclosure.

FIG. 3 illustrates a distributed control system 300 according to one example. The distributed control system 300 includes the plurality of regions 201a-201n and the application server 206 as described above with reference to FIG.

2 and may include the components described above with reference to FIG. 1. The electricity distribution system 115 is provided to transport power from one or more generation facilities 302a-302n (hereinafter "generation facilities 302") to the customer sites 101 provided at the plurality of regions 201a-201n. The control devices 102 are installed at the customer sites 101 distributed throughout the plurality of regions 201a-201n to obtain data corresponding to reactive power sourced and/or absorbed. According to one example, the control devices 102 are configured to transmit the corresponding data to the application server 206, the application server 306, and/or the application servers 106a-106n.

The generation facilities 302 may include a corresponding interface device 310a-310n that is communicatively coupled to the application server 206 and/or the application servers 106a-106n. Alternatively or additionally, the generation facilities 302 may be communicatively coupled to an application server 306 via a network 304. The network 304 may be connected to the Internet via conventional routers and/or firewalls. The network 304 also may be connected to a common carrier wireless network such as a CDMA network. The network 304 also may be connected to a wide area network that is connected to the PLC network.

The application server 306 may include an onboard computer having a processor 316 that is communicatively coupled to a computer readable media 318 that stores data such as in a database or memory. The application server 306 may include a display device having a graphical user interface that enables the electric utility company to control the application server 306. Alternatively, the application server 306 may be remotely controlled by the electric utility company or other third party via the network 304. Software applications are provided at the application server 306 for interfacing with the control device 102, the power meter 103, the application servers 106a-106n, the application server 206, and the energy consuming devices, among other components. The software applications may include instructions that are executed by the processor 316. A software application 308 (hereinafter "application 308") may reside in the application server 306. The application server 306 may be communicatively coupled to the application server 206 and/or the application servers 106a-106n via the network 304 and/or network 204.

According to one example, the generation facilities 302 may be assigned to one or more corresponding regions 201a-201n. The interface devices 310a-310n may communicate with the application server 206 and/or the corresponding application servers 106a-106n to obtain and/or determine, for example, the reactive power sourcing and/or absorbing data profile at the customer sites 101. Furthermore, the interface devices 310a-310n may analyze an amount of reactive power sourced and/or absorbed that is needed at the corresponding regions 201a-201n. For example, the interface devices 310a-310n may access from the application servers 106a-106n, 206 and analyze data corresponding to the reactive power sourced and/or absorbed. The analysis may be performed in substantially real-time and may be relied upon by the corresponding generation facility 302 to determine how much reactive power sourcing and/or absorbing is needed from customer sites 101 within corresponding regions 201a-201n. In this way, the generation facilities 302 may attempt to accurately obtain desired reactive power values within the distribution system of corresponding regions 201a-201n.

Typically, a generation facility 302 may attempt to maintain a desired line power factor by positioning adjustable loads throughout the distribution system of corresponding regions 201a-201n. The adjustable loads may include reactive impedance such as capacitor banks and inductors that are introduced into the distribution system of corresponding regions 201a-201n to adjust reactive power values. Conventional adjustable loads draw power from the distribution system and have delayed responses to real-time changes in load conditions. Furthermore, the adjustable loads have limited effectiveness in controlling power factor at final stages of the distribution systems. Additionally, the adjustable loads may introduce power disruptions at the customer sites 101 if placed too close to the final stages of the distribution systems.

The technology described herein provides systems and methods of sourcing and/or absorbing reactive power into the electric utility grid at the customer sites 101, which may be controlled in aggregate to obtain desired line power factor within the distribution system. The control device 102 may include a power converter having an active rectifier that converts substantially all of the grid alternating current to a direct current. An energy storage device such as a capacitor, battery, or the like may be provided at a DC bus to store energy supplied by the direct current. The active rectifier may source the reactive power component and the stored energy to the electric utility grid on demand in order to adjust reactive power values at the customer sites 101. According to one example, an amount of charge available to the energy storage device may be based upon a difference between power received at the active rectifier and power delivered to the load. For example, if 10 kW is received at the active rectifier and 5 kW is delivered to the load, then 5 kW is available to charge the energy storage device. The power converter may be controlled to prevent power disruptions at the customer sites 101.

The technology described herein provides substantial cost savings to energy generation facilities 302 compared to existing technology. For example, reactive power may be sourced and/or absorbed at the customer sites 101 with a minimum draw of power. Furthermore, the amounts of reactive power sourced and/or absorbed into the electric utility grid may be controlled in substantially real-time based on actual load conditions at the customer sites 101. Accordingly, power disruptions may not be introduced at the customer sites 101.

As described above, the plurality of control devices 102 may include a graphical user interface that enables users or customers to select preferences. For example, the control devices 102 may enable users to select an amount of reactive power to be sourced and/or absorbed at the customer sites 101 during unstable periods leading up to black out or brown out conditions. In this way, the control devices 102 may enable users to obtain energy credits in exchange for allowing power disruptions at the customer sites 101. One of ordinary skill in the art will readily appreciate that customers may select other preferences. Furthermore, the plurality of control devices 102 may include circuitry that enables staggered starts to avoid drawing too much power from the generating facilities 302 following black out or brown out conditions, for example.

From a perspective of the generation facilities 302, the distributed control system 300 provides accurate tools for predicting actual instantaneous demand for an amount of reactive power to be sourced and/or absorbed at the customer sites 101. Accordingly, the generation facilities 302 may more efficiently maintain line power factor within a range of ideal conditions. In this way, the need to distribute adjustable loads throughout the distribution system may be substantially reduced at substantial cost savings.

Additionally, the application servers 106a-106n, 206 may increase overall efficiency associated with maintaining the line power factor at ideal conditions based on obtaining accurate reactive power sourcing and/or absorbing data profiles from the customer sites 101. For example, accurate data may lead to delaying activation of the distributed adjustable loads throughout the distribution systems. In this case, the generation facilities 302 may start the process of stabilizing the electric utility grid by absorbing and/or sourcing excess reactive power from the customer sites 101 before relying on distributed adjustable loads that consume energy.

According to one example, the generation facilities 302 may instantaneously distribute throughout the plurality of regions 201a-201n any absorbed and/or sourced excess reactive power obtained from the customer sites 101. In this way, the distributed control system 300 may allow generation facilities 302 to purchase excess reactive power from other generation facilities 302 over an Internet-based reactive power exchange website. The reactive power exchange website may be configured to communicate with the control devices 102 via wired or wireless connection. The control devices 102 may be installed at customer sites 101 to determine an instantaneous or a total reactive power available over a period. The reactive power data may be collected by the application servers 106a-106n, 206.

Additionally, the distributed control system 300 may employ demand-side monitoring tools to reduce overall energy costs. For example, the distributed control system 300 may provide an interface that creates an energy consumption profile for the customer site 101. The distributed control system 300 may analyze energy consumption profiles from the customer sites 101 and may select to source substantial amounts of reactive power over a period of time. For example, reactive power may be sourced heavily during work hours or scheduled vacations when customers are not at home. For example, based on a customer's energy consumption profile, the distributed control system 300 may automatically source reactive power in order to lower energy costs with minimal disruptions to the customer sites 101.

According to one example, the control devices 102 may regulate voltage and current to the load at the customer sites 101 in addition to controlling reactive power sourced and/or absorbed with respect to the electric grid to obtain desired efficiencies within selected portions of the distribution system. For example, voltage and current may be regulated using a flexible alternating current transmission system. According to one example, the control devices 102 may include a power converter having a rectifier 404 and an inverter 406 provided with an intermediate direct current ("DC") bus. According to another example, the control devices 102 may be incorporated into power meters 103 placed into utility meter sockets at the customer sites 101. Alternatively, the control devices 102 may be positioned proximate to the utility meter sockets at the customer sites 101.

According to one example, the control devices 102 may be located at a service entrance of customer sites 101, such as a home or business, and may be accessed directly or remotely by the electric utility company. According to one example, the application servers 106a-106n, 206 may access one or more control devices 102 to adjust reactive power with respect to the electric utility grid in order to minimize transmission costs by improving a line power factor. One of ordinary skill in the art will readily appreciate that accessing a plurality of control devices 102 at various customer sites 101 within a region 201 will provide improved performance as compared to accessing a single control device 102 at a single customer site 101. One of ordinary skill in the art will readily appreciate that the control devices 102 may be used within the distribution systems of residential, commercial, and industrial buildings, among other distribution systems. In commercial or industrial environments, building managers may be granted access to program the control devices 102 to adjust reactive power locally to enhance a power factor of a distribution system.

According to one example, the control devices 102 may be configured to regulate voltage and current delivered to loads at the customer site 101 by a distribution system associated with residential and/or commercial structures. Additionally, the control devices 102 may adjust reactive power within a distribution network, such as by sourcing and/or absorbing reactive power to a utility grid and/or a building network. Voltage regulation may be performed to save energy by preventing voltage levels from rising beyond a desired threshold. Maintaining voltage levels above a desired voltage level may result in wasting power. According to one example, a bridge design may be employed to adjust reactive power while also regulating voltage.

Figure 4:
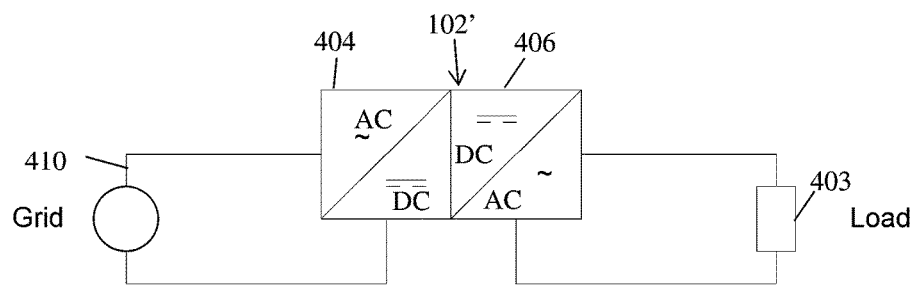
FIG. 4 illustrates a single phase control device within an operational environment according to one example of the disclosure.

FIG. 4 illustrates one example of a single phase control device 102' having a voltage regulator that supplies energy to a load 403. The single phase control device 102' is configured to absorb and source reactive power with respect to an electric utility grid 410. An active rectifier 404 is provided on a grid side of the single phase control device 102'. The active rectifier 404 includes an AC component and a DC component. An inverter 406 is provided on a load side of the single phase control device 102'. The inverter 406 includes a DC component and an AC component. The DC components of the rectifier 404 and inverter 406 are independent with respect to each other and include capacitors and inductors. For example, the DC components of the rectifier 404 and the inverter 406 may include capacitors that store energy for subsequent discharge.

Figure 5:
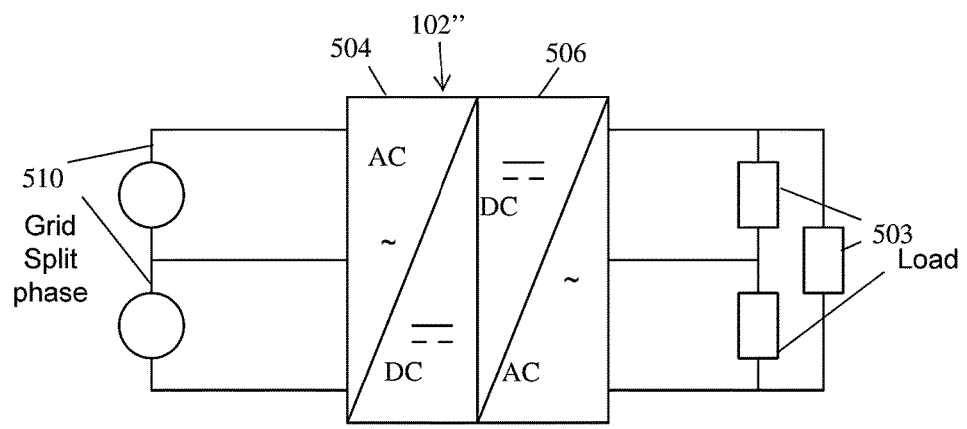
FIG. 5 illustrates a split phase control device within an operational environment according to one example of the disclosure.

FIG. 5 illustrates one example of a split phase control device 102" having a voltage regulator that supplies energy to loads 503. The split phase control device 102" is configured to absorb or source reactive power to an electric grid 510. An active rectifier 504 is provided on a grid side of the split phase control device 102". The active rectifier 504 includes an AC component and a DC component. An inverter 506 is provided on a load side of the split phase control device 102". The inverter 506 includes a DC component and an AC component. The DC components of the rectifier 504 and inverter 506 are independent with respect to each other and include capacitors and inductors. For example, the DC components of the rectifier 504 and the inverter 506 may include capacitors that store energy for subsequent discharge.

Figure 6:
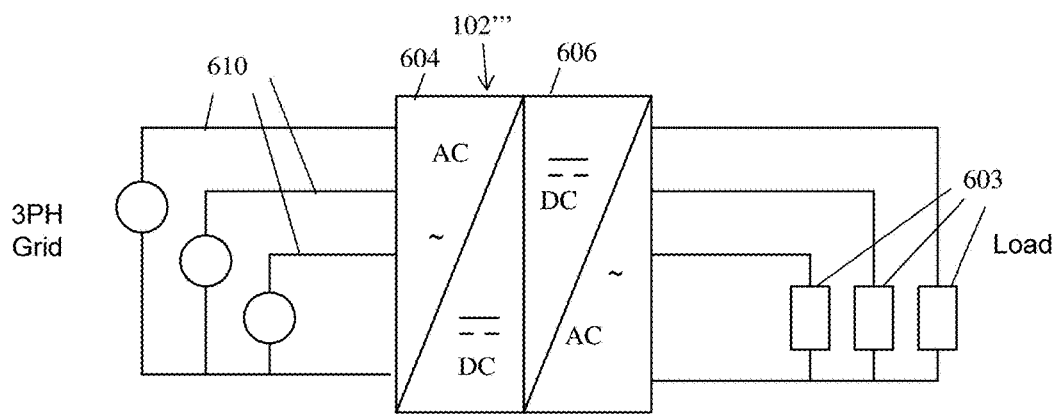
FIG. 6 illustrates a three phase control device within an operational environment according to one example of the disclosure.

FIG. 6 illustrates one example of a three-phase control device 102''' having a voltage regulator that supplies energy to loads 603. The three-phase control device 102''' is configured to absorb or source reactive power to an electric grid 610. An active rectifier 604 is provided on a grid side of the three-phase control device 102'''. The active rectifier 604 includes an AC component and a DC component. An inverter 606 is provided on a load side of the three-phase control device 102'''. The inverter 606 includes a DC component and an AC component. The DC components of the rectifier 604 and the inverter 606 are independent with respect to each other and include capacitors and inductors. For example, the DC components of the rectifier 604 and the inverter 606 may include capacitors that store energy for subsequent discharge.

According to an alternative example, the control device 102''' may be placed at the three-phase mains such as at a transformer location to provide power to multiple customer facilities 101. This alternative placement of the control device 102''' enhances peak current handling capability for events such as motor starts or a short circuit. During motor starts, a peak current may spike to 150A compared to a 30 A RMS continuous current rating. According to one example, a three-phase control device 102''' rated at 90 A RMS continuous may serve multiple customer facilities 101 on each phase, which provides design flexibility and lowers overall costs of power conversion. For example, each phase of the three-phase control device 102''' may include a balance load configuration such as serving three customer facilities 101 per phase. Alternatively, an unbalanced load configuration may be used.

Placing the control device 102''' at the three-phase mains location provides design advantages over placing the control device 102''' at each customer facility 101. In the example of locating the control device 102''' at the three-phase mains to serve nine customer facilities 101, an inductor is provided at each input terminal and each output terminal for a total of six inductors. By contrast, if the control device 102''' is located at the customer site 101, then a total of eighteen inductors are needed, with an inductor provided at each input terminal and each output terminal. According to one example, an additional design advantage to locating the control device 102''' at the three-phase mains is that a same size energy storage device may be used to control the nine customer sites 101 as compared to the size of the energy storage device provided at each the control device 102''' located at the customer site 101.

Furthermore, placing the control device 102''' at the three-phase mains may improve design parameters for saturation current for the inductor, peak current for the silicon, and the ability to distinguish between a short circuit and a motor start in order to protect the control device 102''' without causing nuisance trips. For example, locating the control device 102''' at the three-phase mains allows each power line leading from each customer facility 101 to the control device 102''' to contribute an inductance to the load side. By contrast, locating the control device 102''' at the customer site 101 does not allow extra capacitance from the power lines at the load side.

Figure 7A:
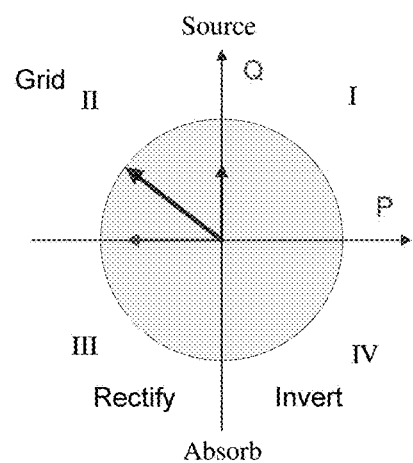
FIG. 7A illustrates a power factor when viewed from the electric utility grid side of the control device according to one example of the disclosure.
Figure 7B:
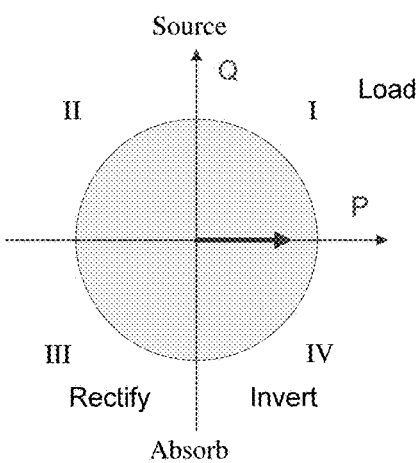
FIG. 7B illustrates the power factor when viewed from the load side of the control device according to one example of the disclosure.

According to one example, FIGS. 7A-7B illustrate polar diagrams of real power (P) on the x-axis and reactive power (Q) on the y-axis for the control device 102 operated with a passive or resistive load on an electric grid having reactive power. With reference to FIG. 4, the portion of the polar diagrams to the left of the y-axis corresponds to power output from the rectifier 404 and the portion of the polar diagrams to the right of the y-axis corresponds to power output from the inverter 406. Furthermore, the portion of the polar diagrams above the x-axis corresponds to sourcing of power while the portion of the polar diagrams below the x-axis corresponds to absorption of power. FIG. 7A illustrates the power factor when viewed from the electric grid side of the control device 102'. FIG. 7B illustrates the power factor when viewed from the load side of the control device 102'. FIG. 7A illustrates positive reactive power on the electric grid side in quadrant II, which represents that the control device 102' is sourcing reactive power to the electric grid.

Figure 8:
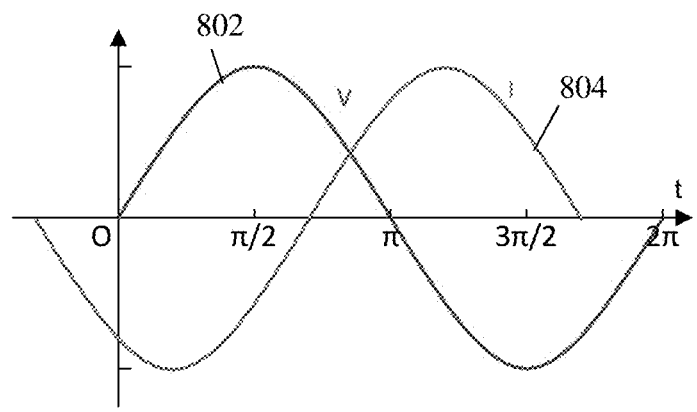
FIG. 8 illustrates a waveform diagram that corresponds to FIG. 7A.
Figure 9:
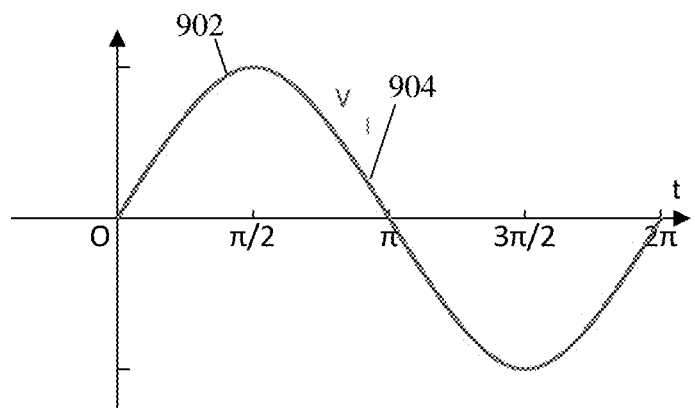
FIG. 9 illustrates a waveform diagram that corresponds to FIG. 7B.

FIG. 8 corresponds to FIG. 7A and illustrates a voltage waveform 802 that is phase-shifted to lag a current waveform 804 when viewed from the electric grid side of the control device 102'. In FIG. 8, the control device 102' operates in quadrant II as illustrated in FIG. 7A with a passive or resistive load on an electric grid having reactive power. FIG. 9 corresponds to FIG. 7B and illustrates a voltage waveform 902 in-phase with a current waveform 904 when viewed from the load side of the control device 102'.

According to another example, FIGS. 10A-10B illustrate polar diagrams of real power (P) on the x-axis and reactive power (Q) on the y-axis for the control device 102 operated with a passive or resistive load on an electric grid having reactive power. FIG. 10A illustrates the power factor when viewed from the electric grid side of the control device 102'. FIG. 10B illustrates the power factor when viewed from the load side of the control device 102'. FIG. 10A illustrates negative reactive power on the electric grid side in quadrant III, which represents that the control device 102' is sinking reactive power from the electric grid.

Figure 12:
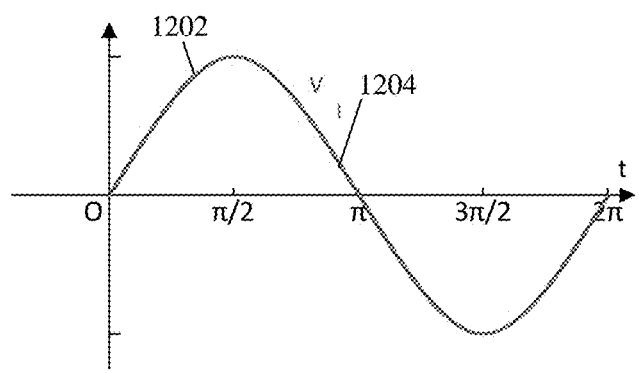
FIG. 12 illustrates a waveform diagram that corresponds to FIG. 10B.

FIG. 11 corresponds to FIG. 10A and illustrates a voltage waveform 1102 that is phase-shifted to lead a current waveform 1104 when viewed from the electric grid side of the control device 102'. In FIG. 11, the control device 102' operates in quadrant III as illustrated in FIG. 10A with a passive or resistive load on an electric grid having reactive power. FIG. 12 corresponds to FIG. 10B and illustrates a voltage waveform 1202 in-phase with a current waveform 1204 when viewed from the load side of the control device 102'.

Figure 13A:
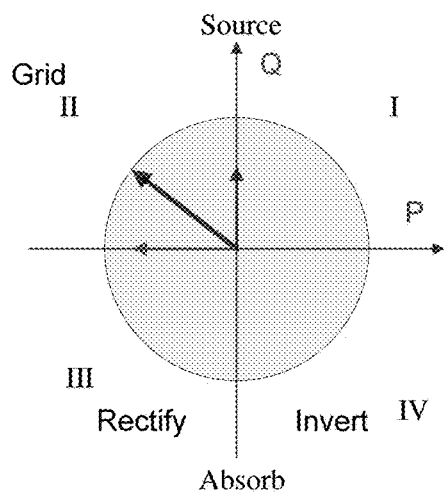
FIG. 13A illustrates a power factor when viewed from the electric utility grid side of the control device according to yet another example of the disclosure.
Figure 13B:
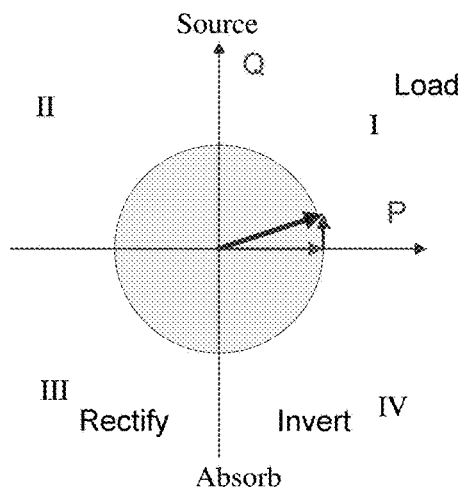
FIG. 13B illustrates the power factor when viewed from the load side of the control device according to yet another example of the disclosure.

According to yet another example, FIGS. 13A-13B illustrate polar diagrams of real power (P) on the x-axis and reactive power (Q) on the y-axis for the control device 102 operated with a non-unity power load such as a motor load on an electric grid having reactive power. FIG. 13A illustrates the power factor when viewed from the electric grid side of the control device 102'. FIG. 13B illustrates the power factor when viewed from the load side of the control device 102'. FIG. 13A illustrates positive reactive power on the electric grid side in quadrant II, which represents that the control device 102' is sourcing reactive power to the electric grid. FIG. 13B illustrates positive reactive power on the load side in quadrant I, which represents that the control device 102' is sourcing reactive power to the load.

Figure 14:
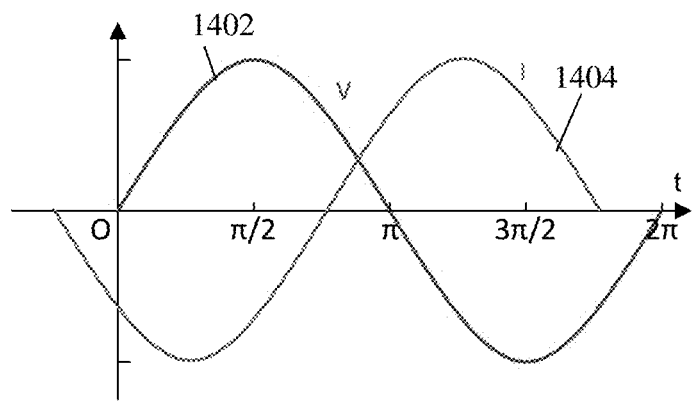
FIG. 14 illustrates a waveform diagram that corresponds to FIG. 13A.
Figure 15:
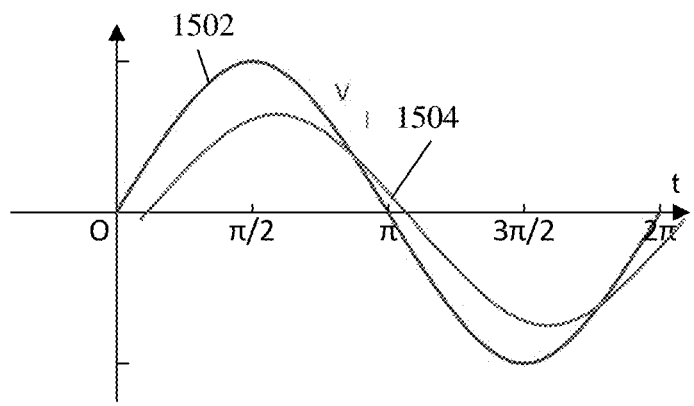
FIG. 15 illustrates a waveform diagram that corresponds to FIG. 13B.

FIG. 14 corresponds to FIG. 13A and illustrates a voltage waveform 1402 that is phase-shifted to lag a current waveform 1404 when viewed from the electric grid side of the control device 102'. In FIG. 8, the control device 102' operates in quadrant II with a non-unity power load such as a motor load on an electric grid having reactive power. FIG. 15 corresponds to FIG. 13B and illustrates a voltage waveform 1502 phase-shifted to lag a current waveform 1504 when viewed from the load side of the control device 102'. The amplitude of the current waveform 1504 confirms a non-unity power load.

Figure 16A:
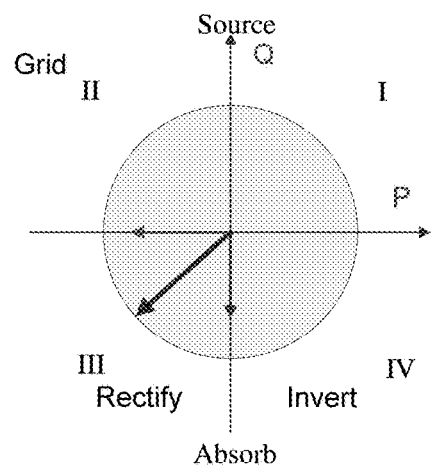
FIG. 16A illustrates a power factor when viewed from the electric utility grid side of the control device according to another example of the disclosure.
Figure 16B:
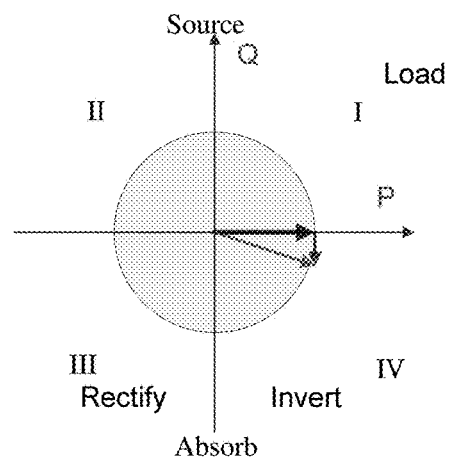
FIG. 16B illustrates the power factor when viewed from the load side of the control device according to another example of the disclosure.

According to yet another example, FIGS. 16A-16B illustrate polar diagrams of real power (P) on the x-axis and reactive power (Q) on the y-axis for the control device 102 operated with a non-unity power load such as a motor load on an electric grid having reactive power. FIG. 16A illustrates the power factor when viewed from the electric grid side of the control device 102'. FIG. 16B illustrates the power factor when viewed from the load side of the control device 102'. FIG. 16A illustrates negative reactive power on the electric grid side in quadrant III, which represents that the control device 102' is sinking reactive power from the electric grid. FIG. 16B illustrates negative reactive power on the load side in quadrant IV, which represents that the control device 102' is sinking reactive power from the load.

Figure 17:
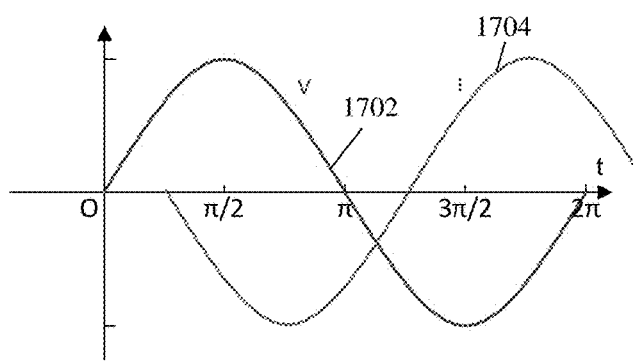
FIG. 17 illustrates a waveform diagram that corresponds to FIG. 16A.

FIG. 17 corresponds to FIG. 16A and illustrates a voltage waveform 1702 that is phase-shifted to lead a current waveform 1704 when viewed from the electric grid side of the control device 102'. In FIG. 17, the control device 102' operates in quadrant III as illustrated in FIG. 16A with a non-unity power load such as a motor load on an electric grid having reactive power. FIG. 18 corresponds to FIG. 16B and illustrates a voltage waveform 1802 phase-shifted to lead a current waveform 1804 when viewed from the load side of the control device 102'. The amplitude of the current waveform 1804 confirms a non-unity power load.

According to yet another example, FIGS. 19A-19B illustrate polar diagrams of real power (P) on the x-axis and reactive power (Q) on the y-axis for the control device 102 operated with a light load or no load such as during nighttime hours on an electric grid having reactive power. FIG. 19A illustrates the power factor when viewed from the electric grid side of the control device 102'. FIG. 19B illustrates the power factor when viewed from the load side of the control device 102'. FIG. 19A illustrates positive reactive power on the electric grid side in quadrant II, which represents that the control device 102' is sourcing reactive power to the grid.

Figure 20:
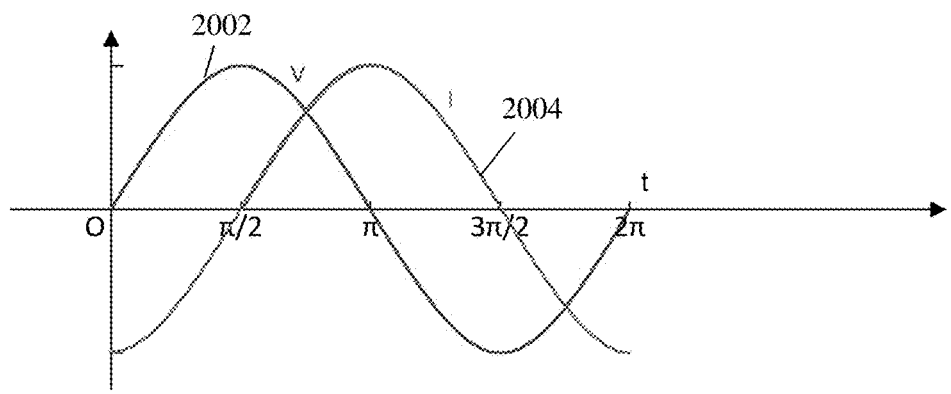
FIG. 20 illustrates a waveform diagram that corresponds to FIG. 19A.
Figure 21:
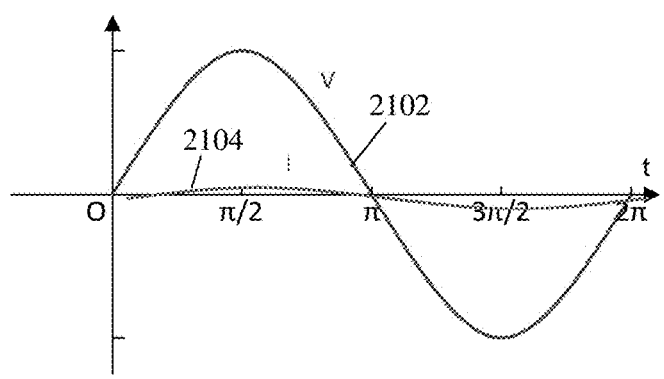
FIG. 21 illustrates a waveform diagram that corresponds to FIG. 19B.

FIG. 20 corresponds to FIG. 19A and illustrates a voltage waveform 2002 that is phase-shifted to lead a current waveform 2004 when viewed from the electric grid side of the control device 102'. In FIG. 20, the control device 102' operates in quadrant II as illustrated in FIG. 19A with a light load or no load such as during nighttime hours on an electric grid having reactive power. FIG. 21 corresponds to FIG. 19B and illustrates a voltage waveform 2102 in-phase with a current waveform 2104 when viewed from the load side of the control device 102'. The amplitude of the current waveform 2104 confirms a light load or no load such as during nighttime hours.

Figure 22A:
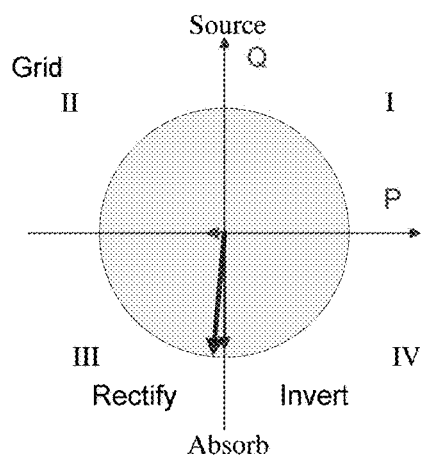
FIG. 22A illustrates a power factor when viewed from the electric utility grid side of the control device according to another example of the disclosure.
Figure 22B:
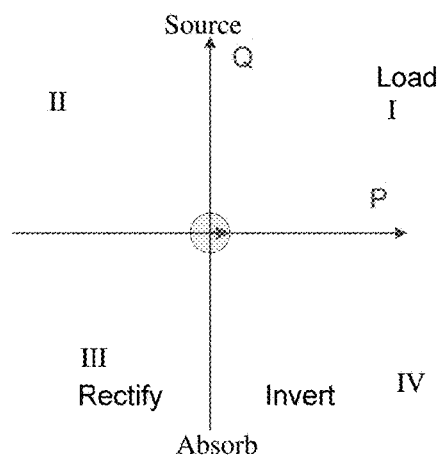
FIG. 22B illustrates the power factor when viewed from the load side of the control device according to another example of the disclosure.

According to yet another example, FIGS. 22A-22B illustrate polar diagrams of real power (P) on the x-axis and reactive power (Q) on the y-axis for the control device 102 operated with a light load or no load such as during nighttime hours on an electric grid having reactive power. FIG. 22A illustrates the power factor when viewed from the electric grid side of the control device 102'. FIG. 22B illustrates the power factor when viewed from the load side of the control device 102'. FIG. 22A illustrates negative reactive power on the electric grid side in quadrant III, which represents that the control device 102' is sinking reactive power from the electric grid.

Figure 23:
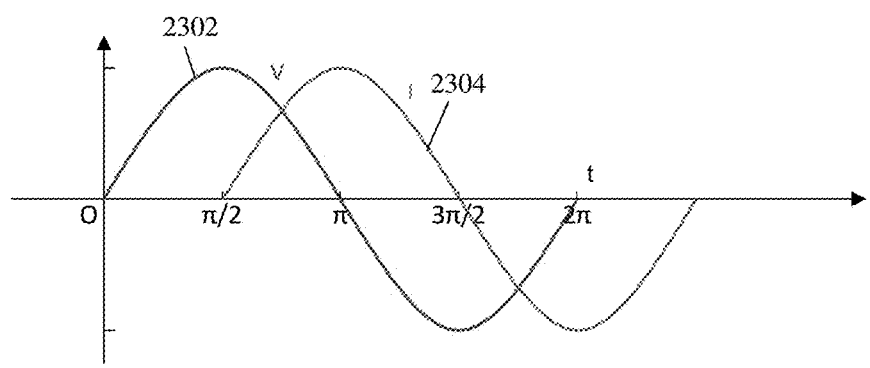
FIG. 23 illustrates a waveform diagram that corresponds to FIG. 22A.
Figure 24:
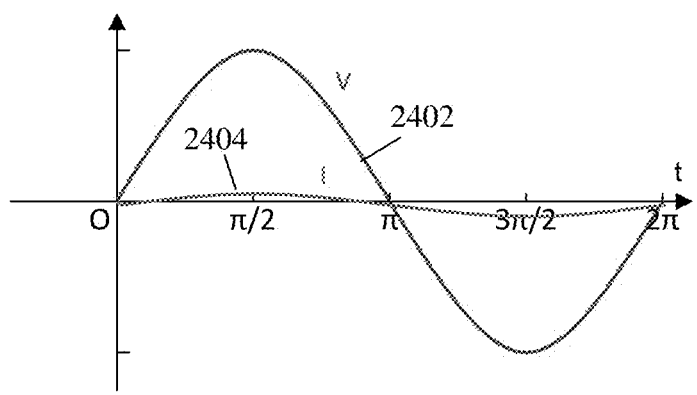
FIG. 24 illustrates a waveform diagram that corresponds to FIG. 22B.

FIG. 23 corresponds to FIG. 22A and illustrates a voltage waveform 2302 that is phase-shifted to lead a current waveform 2304 when viewed from the electric grid side of the control device 102'. In FIG. 23, the control device 102' operates in quadrant III as illustrated in FIG. 22A with a light load or no load such as during nighttime hours on an electric grid having reactive power. FIG. 24 corresponds to FIG. 22B and illustrates a voltage waveform 2402 in-phase with a current waveform 2404 when viewed from the load side of the control device 102'. The amplitude of the current waveform 2404 confirms a light load or no load such as during nighttime hours.

Figure 25:
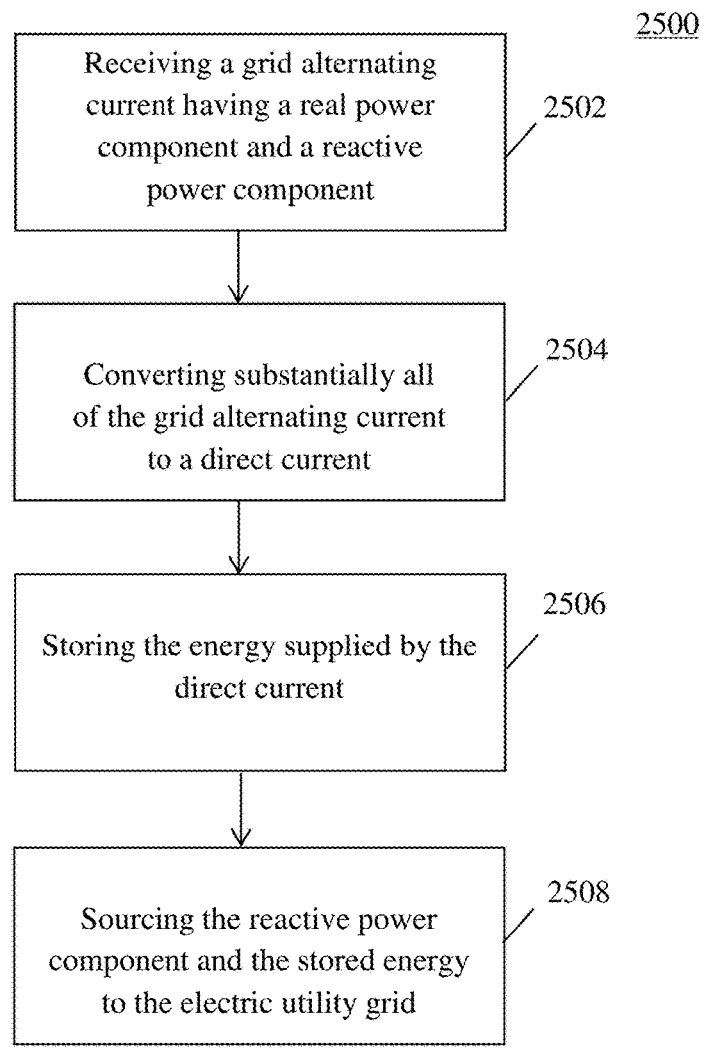
FIG. 25 illustrates a flowchart of an example method according to one example of the disclosure.

FIG. 25 is a flowchart of an example method 2500 according to the present disclosure. The method 2500 may be implemented using the above described systems. For example, the method 2500 may be implemented using distributed control systems provided at customer sites to source and absorb reactive power with respect to the electric grid.

The method 2500 may include receiving a grid alternating current having a real power component and a reactive power component in operation 2502, the grid alternating current originating from an electric utility grid. In operation 2504, substantially all of the grid alternating current is converted to a direct current. In operation 2506, the energy supplied by the direct current is stored and in operation 2508, the reactive power component and the stored energy is sourced to the electric utility grid.

Examples are described above with the aid of functional building blocks that illustrate the implementation of specified functions and relationships thereof. The boundaries of these functional building blocks have been arbitrarily defined herein for the convenience of the description. Alternate boundaries can be defined so long as the specified functions and relationships thereof are appropriately performed. It is to be appreciated that the Detailed Description section, and not the Summary and Abstract sections, is intended to be used to interpret the claims. The Summary and Abstract sections may set forth one or more but not all examples contemplated by the inventor(s), and thus, are not intended to limit the present disclosure and the appended claims in any way.

What is claimed is:

1. A control system provided at a customer site for sourcing and sinking reactive power to an electric utility grid, the control system comprising:
  a terminal electrically coupled to a power source originating from the electric utility grid, the terminal receiving a grid alternating current having a real power component and a reactive power component;
  a power converter that is electrically coupled to the terminal, the power converter comprising:
    an active rectifier that converts substantially all of the grid alternating current to a direct current; and
    an energy storage device that stores energy supplied by the direct current, the active rectifier sourcing the reactive power component and the stored energy through the terminal to the electric utility grid,
    wherein the active rectifier is configured to source a determined amount of the reactive power component and the stored energy for delivery to the electric utility grid through the terminal; and
  a communication terminal that receives a signal from a remote device identifying the determined amount of the reactive power component and the stored energy for delivery to the electric utility grid through the terminal.

2. The control system of claim 1, wherein the active rectifier sinks the reactive power component and the stored energy for delivery to a load.

3. The control system of claim 1, wherein the power converter further comprises an inverter that converts the direct current to a load alternating current, the load alternating current including at least one of a load real power component and a load reactive power component.

4. The control system of claim 3, wherein the inverter generates the load alternating current at a fixed frequency.

5. The control system of claim 1, wherein the energy storage device includes at least one of a battery or a capacitor.

6. A method of sourcing and sinking reactive power to an electric utility grid from a customer site, the method comprising:
  receiving a grid alternating current having a real power component and a reactive power component, the grid alternating current originating from the electric utility grid;

converting substantially all of the grid alternating current to a direct current;

storing energy supplied by the direct current;

sourcing the reactive power component and the stored energy to the electric utility grid including sourcing a determined amount of the reactive power component and the stored energy for delivery to the electric utility grid; and receiving a signal from a remote device identifying the determined amount of the reactive power component and the stored energy for delivery to the electric utility grid.

7. The method of claim 6, further comprising sinking the reactive power component and the stored energy for delivery to a load.

8. The method of claim 6, further comprising converting the direct current to a load alternating current, the load alternating current including at least one of a load real power component and a load reactive power component.

9. The method of claim 8, wherein the load alternating current is generated at a fixed frequency.

10. The method of claim 6, wherein storing energy supplied by the direct current includes storing the energy in at least one of a battery or a capacitor.

11. A non-transitory computer-readable storage medium having stored therein instructions which, when executed by a control device provided at a customer site, cause the control device to:

receive a grid alternating current having a real power component and a reactive power component, the grid alternating current originating from an electric utility grid;

convert substantially all of the grid alternating current to a direct current;

store energy supplied by the direct current;

source the reactive power component and the stored energy to the electric utility grid by sourcing a determined amount of the reactive power component and the stored energy for delivery to the electric utility grid; and receive a signal from a remote device identifying the determined amount of the reactive power component and the stored energy for delivery to the electric utility grid.

12. The non-transitory computer-readable storage medium of claim 11, wherein the instructions, when executed by the control device, cause the control device to sink the reactive power component and the stored energy for delivery to a load.

13. The non-transitory computer-readable storage medium of claim 11, wherein the instructions, when executed by the control device, cause the control device to convert the direct current to a load alternating current, the load alternating current including at least one of a load real power component and a load reactive power component.

14. The non-transitory computer-readable storage medium of claim 13, wherein the instructions, when executed by the control device, cause the control device to generate the load alternating current at a fixed frequency.

* * * * *